United States Patent [19]

Yamamoto et al.

[11] Patent Number: 4,543,849

[45] Date of Patent: Oct. 1, 1985

[54] AUTOMATIC ADJUSTING DEVICE FOR ACTUATING MECHANISM AND ITS CONTROL WIRE

[75] Inventors: Sadashi Yamamoto, Wako; Hiroaki Kayama, Sakato; Masaki Watanabe, Urawa, all of Japan

[73] Assignee: Honda Giken Kogyo Kabushiki Kaisha, Tokyo, Japan

[21] Appl. No.: 318,572

[22] Filed: Nov. 5, 1981

[30] Foreign Application Priority Data

| Nov. 7, 1980 [JP] | Japan | 55-157265 |
| Nov. 7, 1980 [JP] | Japan | 55-157266 |
| Nov. 20, 1980 [JP] | Japan | 55-163548 |
| Nov. 20, 1980 [JP] | Japan | 55-163549 |

[51] Int. Cl.$^4$ ............................................. F16C 1/10
[52] U.S. Cl. .......................... 74/501.5 R; 192/111 A; 188/196 D; 188/196 P; 188/202
[58] Field of Search ................. 74/501 R, 501.5 R; 192/41 S, 111 A; 188/196 P, 196 C, 196 D, 202

[56] References Cited

U.S. PATENT DOCUMENTS

| 2,031,704 | 2/1936 | Gallusser | 188/196 D |
| 2,246,873 | 6/1941 | Browall | 188/196 D |
| 3,759,352 | 9/1973 | Toplis | 74/501.5 R |
| 4,274,300 | 6/1981 | Golobay | 188/202 X |
| 4,304,322 | 12/1981 | Beccaris | 192/111 A |
| 4,344,518 | 8/1982 | Gilmore | 192/111 A |

FOREIGN PATENT DOCUMENTS

2088502A 6/1982 United Kingdom ........... 74/501.5 R

*Primary Examiner*—Leslie A. Braun
*Assistant Examiner*—Frank H. McKenzie, Jr.
*Attorney, Agent, or Firm*—Armstrong, Nikaido, Marmelstein & Kubovcik

[57] ABSTRACT

An automatic adjusting device which is disposed midway of a control wire connecting an actuating mechanism such as a brake and an operating lever. The automatic adjusting device automatically compensates not only the internal wear of the actuating mechanism but also the extension of the control wire so that it can always take up any excessive play or slack of the control wire to thereby impart to the operating lever a minimum play, which corresponds to the proper ineffective stroke of the actuating mechanism.

8 Claims, 19 Drawing Figures

AUTOMATIC ADJUSTING DEVICE FOR ACTUATING MECHANISM AND ITS CONTROL WIRE

BACKGROUND OF THE INVENTION

1. Field of the Invention

The present invention relates to an automatic adjusting device for an actuating mechanism such as a brake or the like for automatically adjusting a play or ineffective stroke of the mechanism and its control wire connected thereto to a proper level.

2. Description of the Prior Art

In order to attain an unchanging operating feeling or quality, it is generally required to compensate the internal wear of the actuating mechanism to maintain its ineffective stroke constant at all times as well as to compensate the extension of the control wire to exclude any useless or excessive play from an operating lever connected to the control wire.

SUMMARY OF THE INVENTION

It is, therefore, an object of the present invention to provide an automatic adjusting device which automatically compensates not only the internal wear of an actuating mechanism such as a brake but also the extension of a control wire for the actuating mechanism thereby to at all times impart to an operating lever only the minimum play corresponding to the proper ineffective stroke of the actuating mechanism and which is made compact so that it can be attached to a portion of the control wire.

In order to achieve the above-specified object, according to the present invention, there is provided an automatic adjusting device for an actuating mechanism and its control wire, comprising: a control wire including an outer wire having a stationary end positioned at the side of an operating lever and a free end positioned at the opposite side, and an inner wire extending through said outer wire and having its one and other ends connected to said operating lever and said actuating mechanism, respectively: a stationary housing receiving a portion of said inner wire; a one-way feed mechanism interposed between said inner wire and said stationary housing for allowing the movement of said inner wire toward said operating lever at all times but restricting the movement of the same in the opposite direction to a predetermined stroke corresponding to the proper ineffective stroke of said actuating mechanism; an adjust bolt being irrotatable relative to said stationary housing and connected to the free end of said outer wire; an adjustor rotatably supported on said housing and axially movable relative thereto within a predetermined stroke, said adjustor being threaded on said adjust bolt; spring means resiliently urging said adjustor in the tensile direction of said inner wire; and a one-way rotating mechanism mounted in said stationary housing for unidirectionally rotating said adjustor in a predetermined direction in response to the reciprocating movement of said adjustor, whereby said adjust bolt is shifted in an axial direction by the unidirectional rotation of said adjustor to increase the effective length of said outer wire.

The above and other objects, features and advantages of the present invention will become apparent from the following detailed description of preferred embodiments when taken in conjunction with the accompanying drawings.

BRIEF DESCRIPTION OF THE DRAWINGS

FIGS. 3 to 8 show a first embodiment of the automatic adjusting device, wherein.

FIGS. 10 and 11 show another modification of the one-way feed mechanism, wherein: FIGS. 12 to 19 show a second embodiment of the automatic adjusting device, wherein.

DESCRIPTION OF THE PREFERRED EMBODIMENTS

Figure 1:
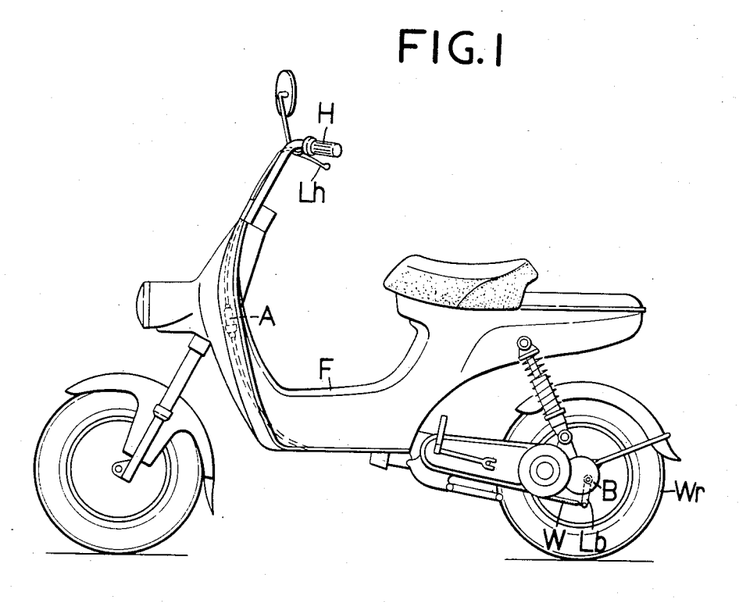
FIG. 1 is a side elevation showing a motorcycle which is equipped with an automatic adjusting device according to the present invention.
Figure 2:
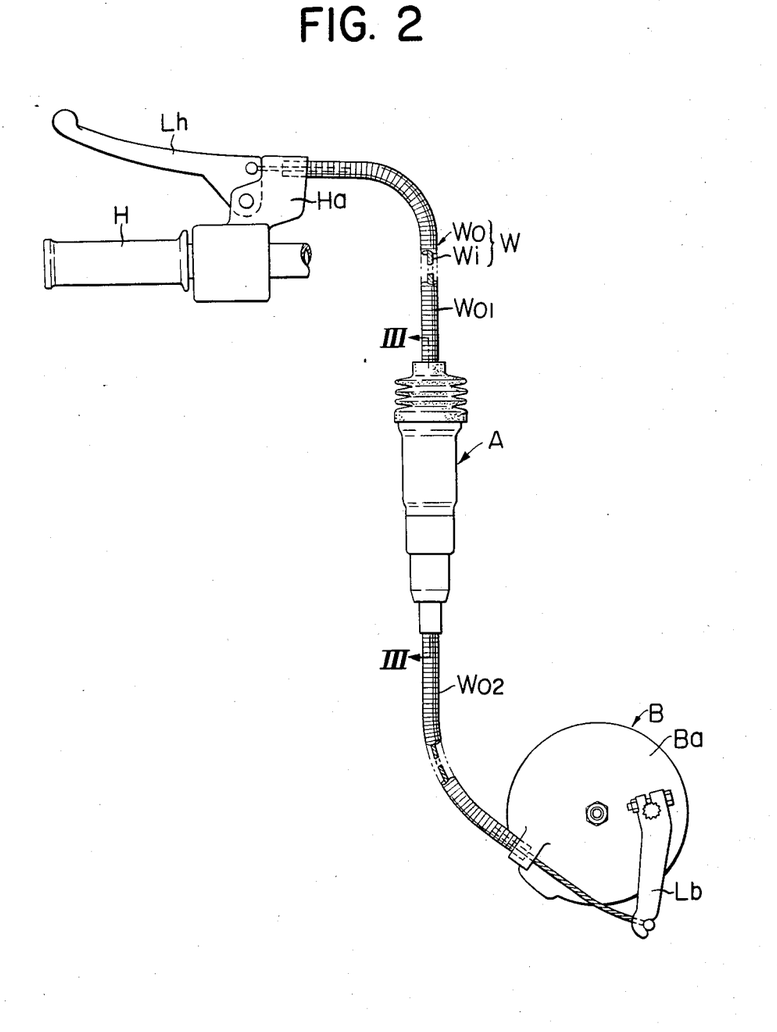
FIG. 2 is a view showing the connecting system between a brake equipped with that automatic adjusting device and an operating lever thereof.
Figure 3:
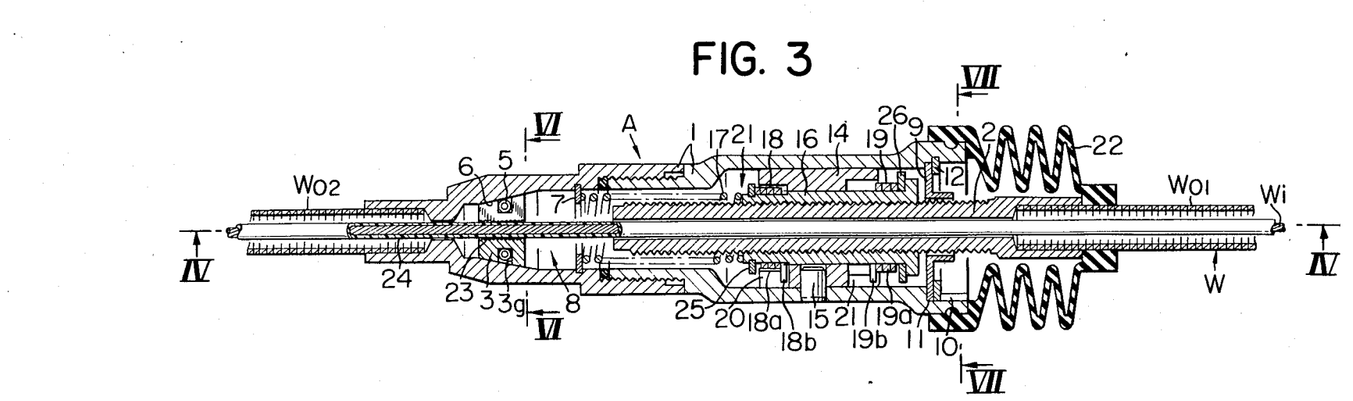
FIG. 3 is a section taken along line III—III of FIG. 2.

The present invention will now be described in connection with the preferred embodiments thereof with reference to the accompanying drawings. The shown embodiments are applied to the rear wheel brake of a motorcycle and its control wire. In FIGS. 1 and 2, an operating lever Lh hinged to the lever holder Ha of the steering handle H of the motorcycle is connected through a control wire W to an actuating lever Lb which is hinged to the brake panel Ba of the drum brake B of the rear wheel Wr of the motorcycle, as will be described in the following.

Specifically, the control wire W is constructed, as customary, of an outer wire Wo and an inner wire Wi which is fitted in the outer wire Wo. The inner wire Wi has both its ends respectively connected to the operating lever Lh and the actuating lever Lb, whereas the outer wire Wo has both its ends clamped by the lever holder Ha and the brake panel Ba, both of which are held stationary.

An automatic adjusting device A according to the present invention is attached to the midway of the control wire W having the construction thus far described, and a first embodiment thereof will now be described with reference to FIGS. 3 to 8.

The outer wire Wo of the control wire W is divided at its midway into a first outer wire Wo1 at the side of the operating lever Lh and a second outer wire Wo2 at the side of the actuating lever Lb, and a cylindrical stationary housing 1 of the automatic adjusting device A, which accommodates a portion of the inner wire Wi, is interposed between the first and second outer wires Wo1 and Wo2. The stationary housing 1 is arranged at a suitable position in the body F of the motorcycle. The inner end of the second outer wire Wo2 is fixed to the left end wall of that stationary housing 1, as viewed in FIGS. 3 to 5 (the left or right will be defined with reference to FIGS. 3 to 5), and the inner end of the first outer wire Wo1 is connected to an adjust bolt 2 which has its right end portion protruding from that stationary housing 1 to the outside. As a result, the inner end of the first outer wire Wo1 becomes a free end.

In the stationary housing 1, there is arranged in a manner to enclose the inner wire Wi a three-jaw chuck 3 (as better seen from FIG. 6), which has its outer circumference so tapered as to have its diameter reduced to the left, i.e., toward the actuating lever Lb. That chuck 3 is exposed to the shrinking force of an annular spring 5 (which may be an O-ring), which is fitted in an outer circumference groove 3g thereof, thereby to apply a predetermined clamping force to the inner wire Wi at all times.

First and second stoppers 6 and 7 are provided in the stationary housing 1 in a manner to axially cross that chuck 3 such that they are spaced from each other at such a distance as to restrict the axial movement of the chuck 3 to a predetermined stroke $S_1$. This stroke corresponds to the proper ineffective stroke of the aforementioned actuating lever Lb. The first stopper 6 is constructed of a taper surface, which is formed on the inner wall of the stationary housing 1 such that it can be fitted on the tapered outer circumference of the chuck 3, whereby, when the chuck 3 is forced thereinto, a strong fastening force is applied to the chuck 3. On the other hand, the second stopper 7 is constructed of a cir-clip which is retained on the inner wall of the stationary housing 1.

Thus, the aforementioned chuck 3, annular spring 5, and first and second stoppers 6 and 7 constitutes a one-way feed mechanism 8 which allows the movement of the inner wire Wi toward the operating lever Lh at all times but regulates the movement of the same in the opposite direction to the predetermined stroke $S_1$.

An end plate 9 is fixed to the inner face of the right end portion of the stationary housing 1 by a cir-clip 12 while being rotationally stopped by the engagement between a key groove 10 and a key 11. That end plate 9 is formed at its center with a generally oval stop hole 13, and the aforementioned adjust bolt 2 is formed at both its sides with chamferred portions 2a so that it may be slidably fitted in that hole 13. As a result, the adjust bolt 2 is always blocked from its rotations by the engagements of those chamferred portions 2a with the flattened portions of the stop hole 13.

An adjust ring 14 is fitted in the inner circumferential wall of the center portion of the stationary housing 1 and is fixed by the action of a positioning pin 15. That adjust ring 14 supports a cylindrical adjustor 16, which is screwed on the aforementioned adjust bolt 2, such that the adjustor 16 can axially slide with a predetermined stroke $S_2$ and can rotate. This sliding stroke $S_2$ of the adjustor 16 is regulated by the fact that a pair of left and right stop rings 25 and 26 fixed to the adjustor 16 come into alternate abutment contacts with both the left and right ends of the stationary adjust ring 14.

A compression spring 17 is sandwiched between the adjustor 16 and the aforementioned second stopper 7. That spring 17 forces the adjust bolt 2 through the adjustor 16 to the right outside of the stationary housing 1 thereby to tense the inner wire Wi such that its spring force is set weaker than that of the not-shown return spring of the brake B. On the other hand, the threads of the adjustor 16 and the adjust bolt 2 are so constructed that they axially shift the irrotatable adjust bolt 2 to the right, i.e., toward the operating lever Lh when the adjustor 16 is rotated in a predetermined direction R relative to the adjust bolt 2. As a result, the effective length of the first outer wire Wo1 can be increased by the axial shift of that adjust bolt 2.

Moreover, first and second one-way clutch springs 18 and 19 are sandwiched between the left and right end portions of the adjustor 16 and the adjust ring 14, respectively.

The aforementioned first one-way clutch spring 18 has a coil portion 18a which is wound on the outer circumference of the adjustor 16 by some fastening force, and an engaging portion 18b rising from the right end of that coil portion 18a is slidably engaged in an inclined groove 20 which is formed in the left end portion of the adjustor 16. In this case, the coil portion 18a is adapted to strengthen the fastening force of the adjustor 16, when this adjustor 16 rotates in the opposite direction to the direction R relative thereto, until it is frictionally connected thereto, and to weaken the fastening force when the adjustor 16 rotates in the direction R. On the other hand, the inclined groove 20 is inclined in the direction R to the right with respect to the axis of the adjustor 16.

The second one-way clutch spring 19 has a coil portion 19a which is wound upon the outer circumference of the adjustor 16 by some fastening force, and an engaging portion 19b rising from the left end of that coil portion 19a is slidably engaged in a straight groove 21 which is formed in the right end portion of the adjustor 16. In this case, the coil portion 19a is adapted to strengthen the fastening force of the adjustor 16, when this adjustor 16 rotates in the opposite direction to the direction R relative thereto, until it is frictionally connected thereto, and to weaken the fastening force when the adjustor 16 rotates in the direction R. On the other hand, the straight groove 21 extends in parallel with the axis of the adjustor 16.

Thus, the aforementioned adjust ring 14, and first and second one-way clutch springs 18 and 19 construct a one-way rotating mechanism 27 which rotates the adjustor 16 in the predetermined direction R in response to the reciprocating movement of the adjustor 16.

An extendible dust-proof boot 22 is interposed under tension between the stationary housing 1 and the first outer wire Wo1.

The operation of this embodiment will be described in the following.

The description is started from the operation of automatically compensating the wear of the brake shoe of the brake B. If the operating lever Lh is operated to pull the inner wire Wi, this inner wire Wi moves along the outer wire Wo to the right, i.e., toward the operating lever Lh thereby to turn the actuating lever Lb of the brake B so that the brake shoe is forced into contact with the brake drum thereby to apply a braking force to the rear wheel Wr.

Figure 5:
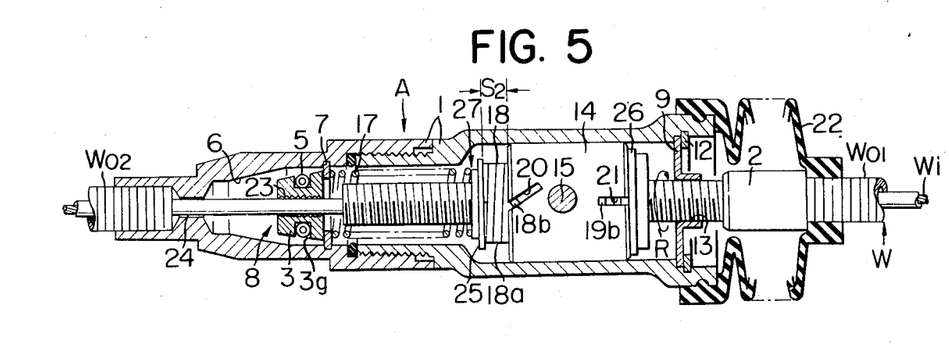
FIG. 5 is a view showing the operation thereof.
Figure 6:
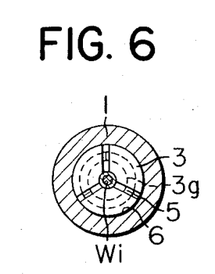
FIG. 6 is a section taken along line VI—VI of FIG. 3.
Figure 7:
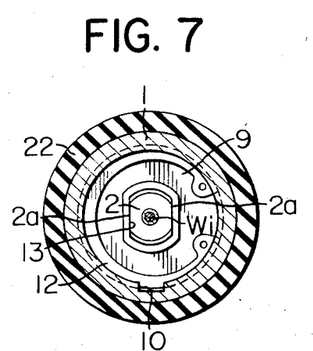
FIG. 7 is a section taken along line VII—VII of FIG. 3.
Figure 8:
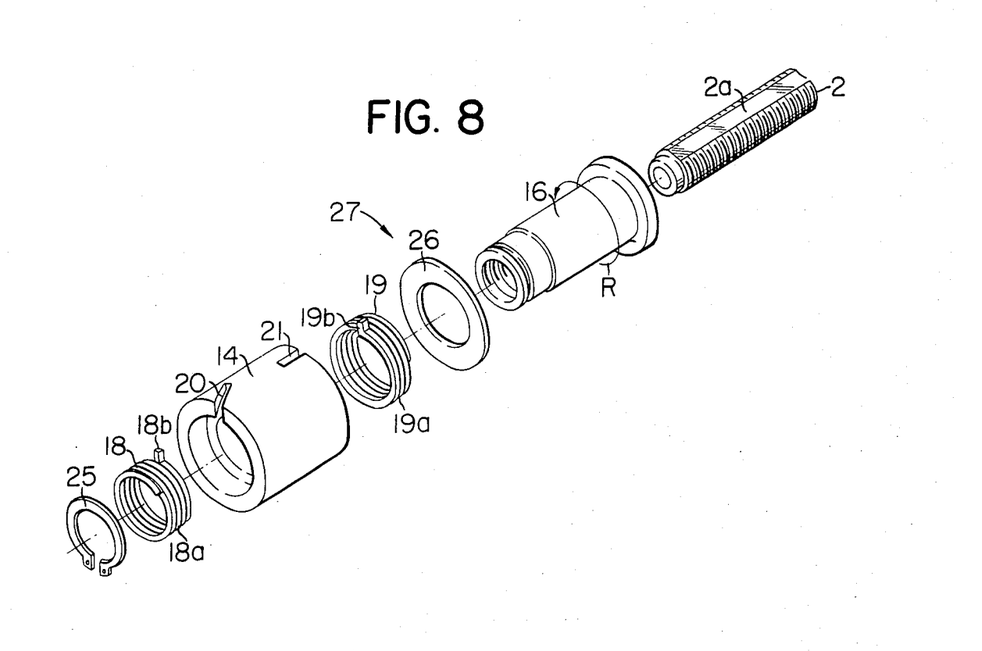
FIG. 8 is an exploded perspective view showing a one-way rotating mechanism of that automatic adjusting device.

Here, when the inner wire Wi moves to the right, the chuck 3 urged to clamp the inner wire Wi by the action of the spring 5 is moved at first together with the inner wire Wi. However, when the rightward stroke of the inner wire Wi is made to exceed the predetermined moving stroke $S_1$ of the chuck 3 by the wear of the brake shoe, as shown in FIG. 5, the chuck 3 comes into abutment contact with the second stopper 7 so that it is blocked from its rightward movement. As a result, only the inner wire Wi continues its rightward movement, while slipping on the chuck 3, so that the brake B can be operated without fail.

Figure 4:
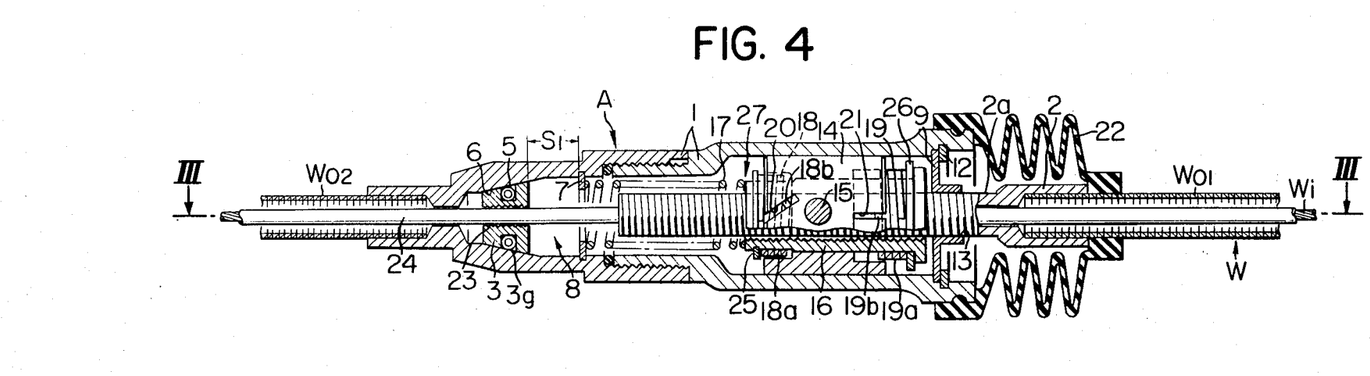
FIG. 4 is a section taken along line IV—IV of FIG. 3.

Now, if the operating lever Lh is released to release the braking force, the actuating lever Lb is turned backward to pull the inner wire by the not-shown return spring of the brake B so that the inner wire Wi moves together with the chuck 3 to the left opposite to the foregoing direction. When this leftward movement reaches the predetermined stroke $S_1$, the chuck 3 is fitted in the first stopper 6, as shown in FIG. 4, until it is stopped, and is exposed to the fastening action of the first stopper 6 thereby to firmly clamp the inner wire Wi so that the leftward movement of the inner wire Wi is stopped. In this case, in order to increase the frictional force between the chuck 3 and the inner wire Wi thereby to prevent the slippage therebetween, it is effective to form the inner circumference of the chuck 3 with anti-slip protrusions 23 having an annular shape, a helical shape or the like and or to form the outer circumference of the inner wire Wi with a cover film 24 which is made of a synthetic resin having a large coefficient of friction, as in the shown embodiment.

Thus, in the brake B, the brake shoe is prevented, even if it is worn, from being spaced from the brake drum more than a distance corresponding to the predetermined moving stroke $S_1$ of the chuck 3 so that the spacing between the brake shoe and the brake drum at the inoperative state of the brake B can be maintained proper.

Next, the eliminating operation of the ineffective stroke of the inner wire Wi will be described in the following. If the play or ineffective stroke is established in the inner wire Wi as a result of either the aforementioned compensation of the wear of the brake shoe or its own extension, the adjust bolt 2 is pushed together with the adjustor, at the inoperative state of the brake B, to the right out of the stationary housing 1 by the resilient force of the compression spring 17 thereby to tense the inner wire Wi, as is shown in FIG. 4. If, at this time, the ineffective stroke of the inner wire Wi is no less than the predetermined sliding stroke $S_2$ of the adjustor 16, the left stop ring 25 comes into abutment contact with the adjust ring 14.

Therefore, when the operating lever Lh is operated to pull the inner wire Wi with a view to operating the brake B, the adjust bolt 2 is moved to the left together with the adjustor 16 against the resilient force of the spring 17 by the extending force, which is applied to the warped center portion of the first outer wire Wo1 from the inner wire Wi, because the resilinet force of the compression spring 17 is set weaker than that of the return spring of the brake B, so that the stop ring 26 at the righthand side of the adjustor 16, as shown in FIG. 5, comes into abutment contact with the adjust ring 14 thereby to block the extension of the first outer wire Wo1, and the rightward movement of the inner wire Wi is then started to operate the brake B. Each time the operation and release of the brake B is repeated in that way, the adjustor 16 is reciprocated to the right and left together with the adjust bolt 2, and the first and second one-way clutch springs 18 and 19 having their coil portions 18a and 19a wound upon the adjustor 16 are also reciprocated at the same time.

Now, during the leftward movements of both the one-way clutch springs 18 and 19 accompanying the operation of the brake B, the engaging portion 18b of the first one-way clutch spring 18 is moved along the stationary inclined groove 20 thereby to rotate the coil portion 18a in the opposite direction to the direction R, whereas the engaging portion 19b of the second one-way clutch spring 19 is moved along by the stationary straight groove 21 thereby to leave the coil portion 19a irrotational. As a result, since the first coil portion 18a weakens the fastening force of the adjustor 16, as has been described hereinbefore, the rotating torque opposite to the direction R, which is to be applied to the adjustor 16, is weak. On the contrary, since the second coil portion 19a strengthens the fastening force, as has been described hereinbefore, when the adjustor 16 is about to rotate in the opposite direction to the direction R, until it is frictionally connected to that adjustor 16, this adjustor 16 is finally blocked from its rotation by the action of the irrotatable second one-way clutch spring 19.

On the contrary, during the rightward movements of both the one-way clutch springs 18 and 19 accompanying the release of the brake B, the engaging portion 18b of the first one-way clutch spring 18 is moved along the inclined groove 20 thereby to rotate the coil portion 18a in the direction R, whereas the second one-way clutch spring 19 does not rotate the coil portion 19a similarly to the above. As a result, the first coil portion 18a strengthens the fastening force of the adjustor 16 thereby to apply a strong rotating torque in the direction R thereto, whereas the second coil portion 19a weakens the fastening force, when the adjustor 16 is about to rotate in the direction R, so that the adjustor 16 rotates in the direction R together with the first one-way clutch spring 18. Moreover, in accordance with the rotations of the adjustor 16 in the direction R, the irrotatable adjust bolt 2 is fed to the right out of the stationary housing 1 thereby to increase the effective length of the first outer wire Wo1. As a result, if the play or ineffective stroke of the inner wire Wi is reduced to a proper level, by the repetitions of the aforementioned operations, the righthand stop ring 26 is held, even at the inoperative state of the brake B, in abutment contact with the adjust ring 14 so that the adjust bolt 2 is not moved to the right and left even if the operation and release of the brake B are repeated.

Figure 9:
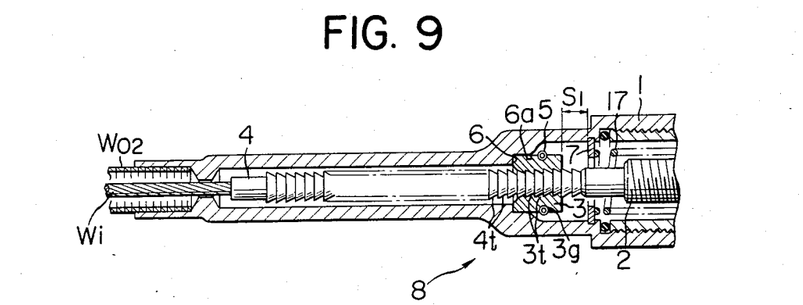
FIG. 9 is a longitudinally sectional side elevation showing a modification of a one-way feed mechanism.

FIG. 9 shows a modification of the one-way feed mechanism 8. In this modification, the one-way feed mechanism is made to have the following construction.

In the stationary housing 1, the adjust rod 4 is fitted on the outer circumference of the inner wire Wi and is enclosed by the three-jaw chuck 3, which is subjected to the tension of the annular spring 5 fitted in the outer circumferential groove 3g thereof thereby to apply a predetermined clamping force to the adjust rod 4 at all times. Those chuck 3 and adjust rod 4 have their respective opposite surfaces formed with saw-toothed one-way clutch teeth 3t and 4t which are made removably engageable with each other and so coactive with each other as to allow the rightward movement of the adjust rod 4 relative to the chuck 3, i.e., the movement of the same toward the operating lever Lh but to block the movement of the same in the leftward direction, i.e., toward the actuating lever Lb.

There are provided in the stationary housing 1 in a manner to axially cross the aforementioned chuck 3 the first and second stoppers 6 and 7 which are spaced at such a distance as to restrict the axial movement of the chuck 3 to the predetermined stroke $S_1$. This stroke $S_1$ corresponds to the proper play or ineffective stroke of the aforementioned actuating lever Lb. The first stopper 6 is constructed of the annular vertical surface which is so formed on the inner wall of the stationary housing 1 as to bear the front end face of the chuck 3, and a cylindrical portion 6a, which is shallower than the aforementioned stroke $S_1$, is made to merge into the outer circumference of that vertical surface so that the aforementioned chuck 3 cannot be opened if it is fitted in that cylindrical portion 6a.

On the other hand, the second stopper 7 is constructed of a cir-clip which is retained in the inner wall of the stationary housing 1.

Figure 10:
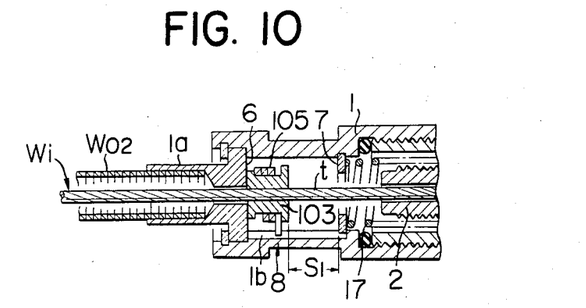
FIG. 10 is a longitudinally sectional side elevation thereof.
Figure 11:
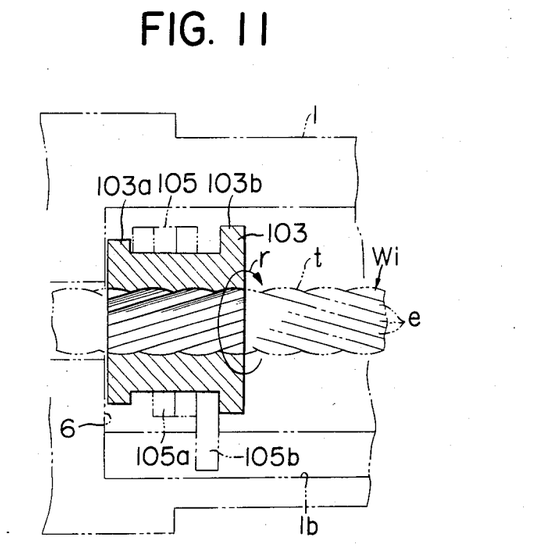
FIG. 11 is an enlarged sectional view showing a portion thereof.

FIGS. 10 and 11 show another modification of the one-way feed mechanism 8. In this modification, the one-way feed mechanism is made to have the following construction.

The inner wire Wi is composed of a plurality of wire elements e which are interwoven to form a Seller's screw thread t on the outer surface.

In the stationary housing 1, a rotor or rotatable member 103 is screwed on the Seller's screw thread and is rotated in a direction r by the action of the Seller's screw thread t when the inner wire Wi is moved rightwardly relative thereto. There are provided in the stationary housing 1 in a manner to axially cross the rotor 103 the first and second stoppers 6 and 7 which are spaced from each other at such a distance as to restrict the axial movement of the rotor 103 to the predetermined stroke $S_1$. This stroke $S_1$ corresponds to the proper play or ineffective stroke of the aforementioned actuating lever Lb. In the modification shown, the first stopper 6 is constructed of the inner end face of an outer wire clamp 1a which is fixed to one end of the stationary housing 1, and the second stopper 7 is constructed of the cir-clip which is retained in the inner wall of the stationary housing 1.

A one-way clutch spring 105 is wound with a predetermined fastening force upon the outer circumference of the rotor 103 between stop flanges 103a and 103b at both the ends of the latter. From one end of the coil portion 105a of that clutch spring 105, there arises an engaging portion 105b which is slidably engaged in an axial groove 1b of the inner wall of the stationary housing 1. In this case, the coil portion 105a is adapted to weaken the fastening force, when the rotor 103 rotates in the aforementioned direction r relative thereto, but to strengthe the fastening force when the rotor 103 rotates in the opposite direction to the direction r.

As a result, when the inner wire Wi moves to the right, the rotor 103 first moves together. However, if the rightward movement of the inner wire Wi is made to exceed the predetermined moving stroke $S_1$ of the rotor 103 by the wear of the brake shoe, the rotor 103 comes into abutment contact with the second stopper 7, until it is blocked from its rightward movement, so that it is rotated in the direction r by the action of the Seller's screw thread t, as has been described hereinbefore. In accordance with these rotations, the coil portion 105a of the one-way clutch spring 105 weakens the fastening force of the rotor 103, as has been described hereinbefore, so that it exerts no restriction upon the aforementioned rotations of the rotor 103. As a result, only the inner wire Wi continues its rightward movement while establishing its slippage relative to the rotor 103.

On the other hand, if the inner wire Wi is moved together with the rotor 103 in the opposite direction to the above, the rotor 103 comes into abutment contact with the first stopper 6 until it is stopped thereby, when its leftward movement reaches the predetermined stroke $S_1$, so that only the inner wire Wi is going to further move to the left. As a result, the rotor 103 receives the rotating torque in the direction opposite to the above, i.e., the direction r from the Seller's screw thread t. However, if the rotor 103 is about to rotate in the opposite direction to the direction r, the coil portion 105a of the one-way clutch spring 105 strengthens the fastening force of the rotor 103 so that the irrotatable one-way clutch 105 is frictionally connected to the rotor 103 thereby to block the rotations of the latter. As a result, the irrotatable inner wire Wi is also halted at that position.

FIGS. 12 to 19 show another embodiment of the automatic adjusting device A. In this embodiment, the portions corresponding to those of the foregoing embodiment are indicated at similar reference letters. The second embodiment will be described in the following.

The outer wire Wo of the control wire W is divided at its midway into a first outer wire Wo1 at the side of the operating lever Lh and a second outer wire Wo2 at the side of the actuating lever Lb, and a cylindrical stationary housing 1 of the automatic adjusting device A, which accommodates a portion of the inner wire Wi, is interposed between the first and second outer wires Wo1 and Wo2. The stationary housing 1 is arranged at a suitable position in the body F of the motorcycle. The inner end of the second outer wire Wo2 is fixed to the left end wall of that stationary housing 1, as viewed in FIGS. 12 to 14 (the left or right will be defined with reference to FIGS. 12 to 14.), and the inner end of the first outer wire Wo1 is connected to an adjust bolt 2 which extends through the right end wall of the stationary housing 1. As a result, the inner end of the first outer wire Wo1 becomes a free end.

In the stationary housing 1, an adjust rod 4 is so connected to the inner wire Wi as to form a part thereof, and a clutch member 203 engaging with one side face of that adjust rod 4 is so received in a clutch member receiving portion 1c, which is formed in the stationary housing 1, that it can move as long as the predetermined stroke $S_1$ in the axial direction of the adjust rod 4. The aforementioned predetermined stroke $S_1$ corresponds to the proper play or ineffective stroke of the actuating lever Lb, i.e., the proper spacing between the brake shoe and drum of the brake B.

The clutch member 203 is urged by a spring 205 in a direction to engage with the adjust rod 4, and these adjust rod 4 and clutch member 203 have their engaging faces formed with saw-toothed one-way clutch teeth 4t and 203t which are made removably engageable with each other. These teeth 4t and 203t are made so coactive with each other as to allow the rightward movement of the adjust rod 4 relative to the clutch member 203, i.e., the movement of the same toward the operating lever Lh but to block the movement of the same to the right, i.e., toward the actuating lever Lb.

The clutch receiving portion 1c has its bottom made shallower at the side of the actuating lever Lb and deeper at the side of the operating lever Lh. The shallower bottom portion so restrains the clutch member 203 that the one-way clutch teeth 4t and 203t cannot be disengaged, and the deeper bottom portion so releases the clutch member 203 that their disengagement is allowed.

Thus, the aforementioned adjust rod 4, clutch member 203, spring 205 and clutch member receiving portion 1c constructs the one-way feed mechanism 8 which allows the movement of the inner wire Wi toward the operating lever Lh at all times but restricts the movement of the same in the opposite direction to the predetermined stroke $S_1$.

The adjust rod 4 is slidably supported at its opposite side to the one-way clutch teeth 4t on a bearing 1d, which is formed in the stationary housing 1, so that its lateral movement and rotation are blocked. The right end portion of the adjust rod 4 thus made irrotatable is slidably fitted in the aforementioned adjust bolt 2, and a rotation stop pin 208, which is retained at the end portion of the adjust rod 4, is slidably fitted in an axial groove 209 which is formed in the side wall of the adjust bolt 2. As a result, the adjust bolt 2 is allowed to slide but blocked from its rotation by the action of the rotation stop pin 208.

Between the adjust rod 4 and the adjust bolt 2, there is sandwiched the compression spring 17 which acts to force the adjust bolt 2 to the right out of the stationary housing 1 thereby to tense the inner wire Wi.

On the other hand, the stationary housing 1 has its inner wall formed adjacent to the right of the aforementioned clutch member receiving portion 1c with an adjustor receiving portion 1c, in which the cylindrical adjustor 16 is received axially slidably with the predetermined stroke $S_2$ and rotatably, and the aforementioned adjust bolt 2 is screwed in that adjustor 16. In order to maintain the sliding stroke $S_2$ of the adjustor 16 constant, there are fixed to the outer circumference of the adjustor 16 a pair of stop rings 25 and 26 which interpose an adjustor receiving portion 1e therebetween at a spacing corresponding to the aforementioned stroke $S_2$. On the other hand, the screwed portions of the adjustor 16 and the adjust bolt 2 are so constructed that, when the adjust bolt 2 is rotated in the predetermined direction R, the irrotatable adjust bolt 2 is axially shifted to the right, i.e., toward the operating lever Lh. According to the axial shift of the adjust bolt 2, the effective length of the first outer wire Wo1 can be increased.

Figure 18:
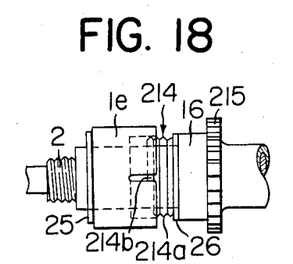
FIG. 18 is a top plan view showing an essential portion of the automatic adjusting device.
Figure 19:
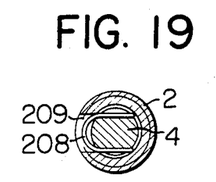
FIG. 19 is an enlarged section taken along line XIX—XIX of FIG. 14.

Between the adjustor receiving portion 1e and the adjustor 16, moreover, there is sandwiched a one-way clutch spring 214 which allows the rotation of the adjustor 16 only in the aforementioned predetermined direction R. That spring 214 is formed, as shown in FIG. 18, with a coil portion 124a which is wound on the outer circumference of the adjustor 16 and which has its one end retained as a fixed end to the adjustor receiving portion 1e. Thus, if the rotating torque in the predetermined direction R is applied to the adjustor 16, the coil portion 124a is slackened to allow the rotation of the adjustor 16. However, if the rotating torque in the opposite direction is applied, the coil portion 214a clamps the outer circumference of the adjustor 16 thereby to block the rotation of the latter.

The adjustor 16 is integrally formed at its one side with a rachet wheel 215 which is operative to rotate the adjustor 16 in the aforementioned predetermined direction R.

In the vicinity of the aforementioned adjustor 16, an adjust lever 216 having a bell crank shape is hinged to the stationary housing 1 by means of a lever pin 217. The adjust lever 126 thus hinged has its first arm 216a facing the outside surface of the lefthand stop ring 25 and its second arm 126b made so longer than the aforementioned first arm 126a that its leading end is brought by its own elastic force into engagement with one of the teeth of the ratchet wheel 215. A tension spring 218, which has its one end bound to the stationary housing 1, has its other end retained on that adjust lever 216, and its tensile force acts to bring the first arm 216a into abutment contact with the outer side of the stop ring 25 and to rotate the ratchet wheel 215 in the aforementioned predetermined direction R through the second arm 216b.

Thus, the aforementioned one-way clutch spring 214, ratchet wheel 215, adjust lever 216 and tension spring 218 constitute the one-way rotating mechanism 27 which serves to unidirectionally rotate the adjustor 16 in the predetermined direction R in response to the reciprocal sliding movements thereof.

The expansible dust-proof boot 22 is interposed under tension between the stationary housing 1 and the adjust bolt 2.

The operation of this second embodiment will be described in the following.

First, the operation of automatically compensating the wear of the brake shoe of the brake B will be described. If the operating lever Lh is operated to pull the inner wire Wi, this inner wire Wi moves along the outer wire Wo to the right, i.e., toward the operating lever Lh thereby to turn the actuating lever Lb of the brake B so that the brake shoe is forced into contact with the brake drum thereby to apply a braking force to the rear wheel Wr. At this time, the adjust rod 4 moves together with the inner wire Wi to the right, until the brake B exhibits its braking function, and is accompanied at the first stage of its movement by the clutch member 203 which is held in engagement with the adjustor rod 4 by the biasing force of the spring 205. However, if the rightward stroke of the adjust rod 4 exceeds the predetermined moving stroke $S_1$ of the clutch member 203 as a result of the wear of the brake shoe, the clutch teeth 4t and 203t slips against the biasing force of the spring 205 so that the adjust rod 4 and the inner wire Wi continue their rightward movements while leaving the clutch member 203 at the righthand limit thereof, as shown in FIG. 13, whereby the brake B can be operated without fail.

Figure 12:
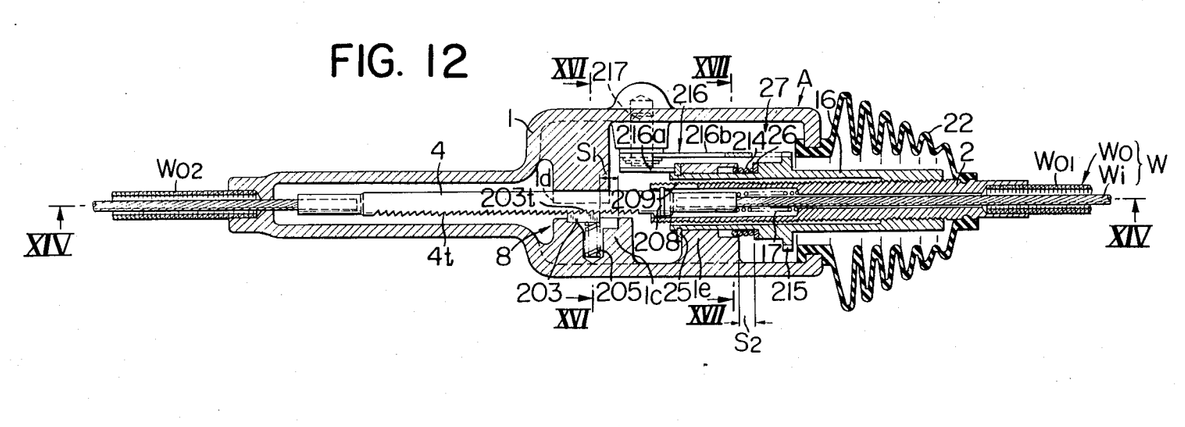
FIG. 12 is a sectional view similar to FIG. 2.

Therefore, if the operating lever Lh is released to release the braking force, the actuating lever Lb is rotated backward by the not-shown return spring of the brake B to pull the inner wire Wi thereby to retract said wire Wi and adjust rod 4 to the left. However, since the clutch teeth 4t and 203t cannot be disengaged by the leftward movement of the adjust rod 4, the clutch member 203 moves to the left together with the adjust rod 4, and the adjust rod 4 and accordingly the inner wire Wi is blocked from moving to the left when the leftward movement reaches the predetermined stroke $S_1$, i.e., when the clutch member 203 reaches its left limit, as shown in FIG. 12. Thus, in the brake B, the brake shoe is prevented, even if it is worn, from being spaced from the brake drum more than a distance corresponding to the predetermined moving stroke $S_1$ of the clutch member 203 so that the spacing between the brake shoe and the brake drum at the inoperative state of the brake B can be maintained proper.

Next, the operation of eliminating the ineffective stroke of the inner wire Wi will be described in the following. If the ineffective stroke is developed in the inner wire Wi as a result of either the aforementioned compensation of the wear of the brake shoe or its own extension, the adjust bolt 2 is pushed at the inoperative state of the brake B to the right out of the stationary housing 1 by the resilient force of the compression spring 17 thereby to tense the inner wire Wi, as is shown in FIG. 12. If, at this time, the ineffective stroke of the inner wire Wi is not less than the predetermined sliding stroke $S_2$ of the adjustor 16, the left stop ring 25 comes into abutment contact with the adjustor receiving portion 1e.

Figure 13:
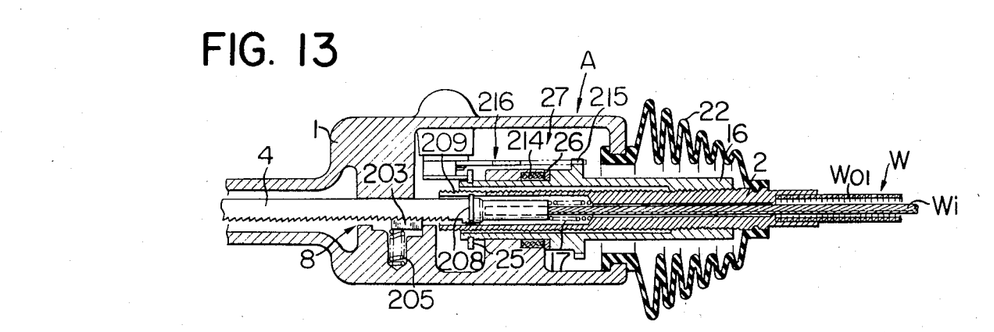
FIG. 13 is a view explaining the operation thereof.

Therefore, when the operating lever Lh is operated to pull the inner wire Wi with a view to operating the brake B, the adjust bolt 2 is moved to the left against the elastic force of the spring 17 by the extending force, which is applied to the warped center portion of the first outer wire Wo1 from the inner wire Wi, because the resilient force of the compression spring 17 is set weaker than that of the return spring of the brake B, so that the stop ring 26 at the righthand side of the adjustor 16 as shown in FIG. 13 comes into abutment contact with the adjustor receiving portion 1e thereby to block the extension of the first outer wire Wo1, and the rightward movements of the inner wire Wi and the adjust rod 4 are then started to operate the brake B. Each time the operation and release of the brake B is repeated in that way, the adjustor bolt 2 is reciprocated together with the adjustor 16 to the right and left.

Figure 14:
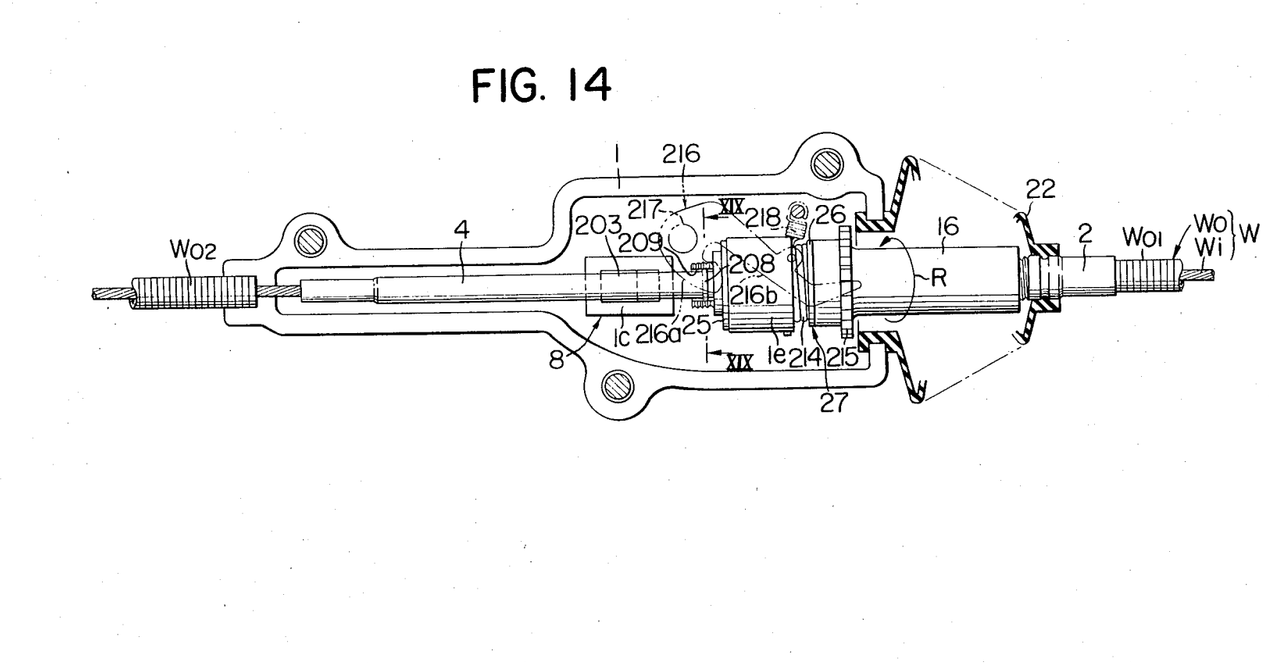
FIG. 14 is a section taken along line XIV—XIV of FIG. 12.
Figure 15:
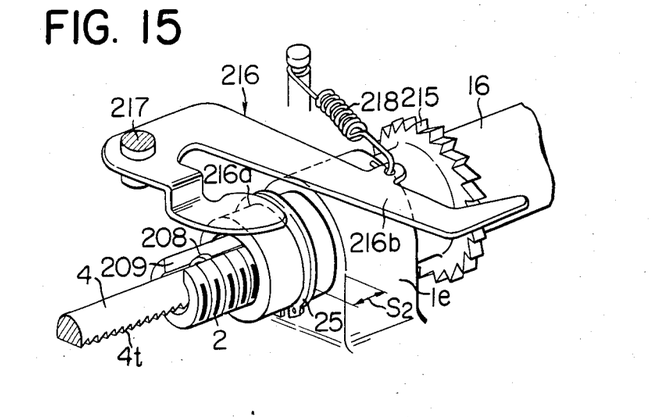
FIG. 15 is a perspective view showing an essential portion of the automatic adjusting device.
Figure 16:
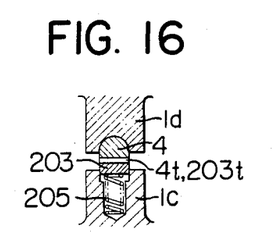
FIG. 16 is a section taken along line XVI—XVI of FIG. 12.
Figure 17:
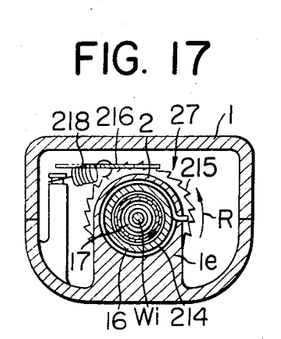
FIG. 17 is a section taken along line XVII—XVII of FIG. 12.

Now, when the adjustor 16 moves to the left in accordance with the operation of the brake B, the lefthand stop ring 25 pushes the first arm 216a to rock the adjust lever 216 clockwise, as viewed in FIG. 14, against the action of the tension spring 218 thereby to apply the rotating torque in the opposite direction to the direction R from the second arm 216b to the rachet wheel 215 of the adjustor 16. However, since this adjustor 16 is blocked from its rotation in the opposite direction to the direction R by the action of the one-way clutch spring 214, as has been described hereinbefore, the second arm 216b simply slides on the teeth of the rachet wheel 215. In accordance with the rightward movement of the adjustor 16 accompanying the release of the brake B, on the other hand, the adjust lever 126 is rocked counterclockwise, as viewed in FIG. 14, by the force of the tension spring 218 to apply the rotating torque in the direction R from the second arm 216b to the ratchet wheel 215 so that this ratchet wheel 215 and accordingly the adjustor 16 is released, as has been described hereinbefore, from the one-way clutch spring 214 and is rotated in the direction R relative to the irrotatable adjustor bolt 2 to feed this adjustor bolt 2 to the right out of the stationary housing 1 thereby to increase and adjust the effective length of the outer wire Wo. As a result, if the play or ineffective stroke of the inner wire Wi is reduced to a proper level by the repetitions of the aforementioned operations, the righthand stop ring 26 is held, even at the inoperative state of the brake B, in abutment contact with the adjustor receiving portion 1e so that the adjustor bolt 2 is not mobed to the right and left even if the operation and release of the brake B are repeated.

In all the embodiments thus far described, in case the inner wire Wi between the stationary housing 1 and the brake B is arranged in a straight line in accordance with the set position of the automatic adjusting device A, the second outer wire Wo2 can be dispensed with. In this case, however, it is necessary to fix the stationary housing to the motorcycle body F. In short, in any case, it is sufficient that the stationary housing be immovable at least in the axial direction of the control wire W.

As has been described hereinbefore, according to the present invention, there is disposed in the midway of the control wire W connecting the actuating mechanism such as the brake B and the operating lever Lh the automatic adjusting device A which automatically compensates not only the internal wear of the actuating mechanism but also the extension of the control wire W thereby to at all times impart to the operating lever Lh only the minimum play corresponding to the proper ineffective stroke of the actuating mechanism. Therefore, the operating feeling or quality of the actuating mechanism can be maintained excellent at all times, and the present invention can be applied without difficulty to any prior art actuating mechanism of the similar kind merely by replacing the control wire with that having the automatic adjusting device A without any modification of the actuating mechanism.

Moreover, the aforementioned automatic adjusting device A is constructed into such a unit structure as can be mounted in the single stationary housing 1 disposed midway of the control wire W, and the one-way feed mechanism 8 mounted in the stationary housing 1 is constructed of the chuck 3, which directly clamps the inner wire Wi, and the first and second stoppers 6 and 7, which are operative to control the moving stroke and the clamping force of the chuck 3 so that the space occupied by the on mechanism 8 can be greatly reduced. As a result, the device as a whole can be made so compact as to be easily disposed in a narrow space.

Further, the adjust ring 14 is formed with the inclined groove 20 and the straight groove 21; and the paired first and second one-way clutch springs 18 and 10 are wound under the predetermined clamping forces on the outer circumference of the adjustor 16 rotatably and slidably fitted in the aforementioned adjust ring 14; and the engaging portion 18b of the first one-way clutch spring 18 and the engaging portion 19b of the second one-way clutch spring 19 are slidably engaged in the aforementioned inclined and straight grooves 20 and 21, respectively, so that both the one-way clutch springs strengthen their clamping forces when the adjustor rotates in one direction (opposite to the direction R) relative thereto, but weaken their clamping forces when the adjustor rotates in the other direction (i.e., the direction R). With this arrangement, the adjustor can be rotated in the aforementioned other direction in accordance with the reciprocating stroke thereof by the interactions between the first one-way clutch spring 18 and the inclined groove 20 and between the second one-way clutch spring 19 and the straight groove 21. Furthermore, since the construction thus far described uses a reduced number of parts and is made by their concentric arrangement, it is possible to provide the one-way rotating mechanism which is simple and compact in construction.

What is claimed is:

1. An automatic adjusting device for an actuating mechanism and its control wire, comprising: a control wire including an outer wire having a stationary end fixedly secured to a lever holder and a movable end, and an inner wire extending through said outer wire and having its one and other ends connected to said operating lever and said actuating mechanism, respectively; a stationary housing receiving a portion of said inner wire; a one-way feed mechanism interposed between said inner wire and said stationary housing for allowing the free movement of said inner wire toward said operating lever at all times but restricting the movement of the same in the opposite direction to a predetermined stroke corresponding to the proper ineffective stroke of said actuating mechanism; an adjust bolt being fixed relative to said stationary housing and connected to the movable end of said outer wire; an adjustor rotatably supported in said housing and axially movable relative thereto within a predetermined stroke, said adjustor being threaded on said adjust bolt; spring means resiliently urging said adjustor in a tensile direction of said inner wire; and a one-way rotating mechanism mounted in said stationary housing for unidirectionally rotating said adjustor in a predetermined direction in response to the reciprocating movement of said adjustor, whereby said adjust bolt is shifted in an axial direction by the unidirectional rotation of said adjustor to increase the effective length of said outer wire.

2. An automatic adjusting device as set forth in claim 1, wherein said one-way feed mechanism includes: a chuck enclosing said inner wire for resiliently applying a predetermined clamping force to said inner wire; a first stopper on said stationary housing for stopping the movement of said chuck toward said actuating mechanism and for applying a fastening force to said chuck to block slippage between said chuck and said inner wire; and a second stopper on said stationary housing for allowing only the movement of said inner wire while restricting the movement of said chuck from its stopped position defined by said first stopper toward said actuating mechanism to said predetermined stroke within which said adjustor is axially movable relative to said housing.

3. An automatic adjusting device as set forth in claim 2, wherein said chuck has its inner circumference formed with anti-slip protrusions for stopping the slippage of said inner wire relative to said chuck.

4. An automatic adjusting device as set forth in claim 2, wherein said inner wire has its outer surface covered with a film made of a symthetic resin.

5. An automatic adjusting device as set forth in claim 1, wherein said one-way feed mechanism includes: a screw thread formed on the outer circumference of said inner wire; a rotatable member threaded on said Seller's screw thread within said stationary housing; stopper means for restricting the axial movement of said rotatable member relative to said inner wire within a predetermined range; and a one-way clutch spring wound on the outer circumference of said rotatable member with a predetermined fastening force and having an engaging portion engaged with said stationary housing for axial movement.

6. An automatic adjusting device as set forth in claim 5, wherein said inner wire is composed of a plurality of wire elements which are interwoven to form said Seller's screw thread.

7. An automatic adjusting device as set forth in claim 5, wherein said stopper means has a pair of stopper members mounted on said stationary housing in an axially spaced relation with each other.

8. An automatic adjusting device as set forth in any one of the preceding claims, wherein said one-way rotating mechanism comprises an adjust ring fixed to said stationary housing and mounted on the outer circumference of said adjustor for rotation and axial movement relative thereto, said adjust ring having an inclined groove which is inclined with respect to the rotation axis of said adjust ring, and a straight groove which is in parallel with said axis; and a pair of first and second one-way clutch springs wound on the outer circumference of said adjustor with predetermined fastening forces, said first one-way clutch spring being formed with an engaging portion which is slidably engaged in said inclined groove, said second one-way clutch spring being formed with an engaging portion which is slidably engaged in said straight groove, said first and second one-way clutch springs being adapted to increase their respective fastening forces against said adjustor when said adjustor is rotated in one direction relative thereto, but to reduce their fastening forces when said adjustor is rotated in the opposite direction, whereby said adjustor is unidirectionally rotated in said opposite direction in accordance with the reciprocating movement thereof relative to said adjust ring.

* * * * *